(12) United States Patent
Rattunde

(10) Patent No.: US 10,967,522 B2
(45) Date of Patent: Apr. 6, 2021

(54) TWIN GRIPPER

(71) Applicant: RATTUNDE & CO. GMBH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 0 days.

(21) Appl. No.: 15/036,403

(22) PCT Filed: Nov. 10, 2014

(86) PCT No.: PCT/EP2014/074184
§ 371 (c)(1),
(2) Date: May 12, 2016

(87) PCT Pub. No.: WO2015/071222
PCT Pub. Date: May 21, 2015

(65) Prior Publication Data
US 2016/0297078 A1 Oct. 13, 2016

(30) Foreign Application Priority Data

Nov. 14, 2013 (DE) ...................... 10 2013 112 572.7

(51) Int. Cl.
*B25J 15/00* (2006.01)
*B25J 15/02* (2006.01)

(52) U.S. Cl.
CPC ....... *B25J 15/0052* (2013.01); *B25J 15/0033* (2013.01); *B25J 15/0273* (2013.01)

(58) Field of Classification Search
CPC .......................... B25J 15/0052; B25J 15/0273; B25J 15/0033; B25B 7/00; B25B 7/02; B25B 7/22; B25B 13/58

USPC ....... 29/243.55, 243.53, 244, 261, 268, 270, 29/278, 271
See application file for complete search history.

(56) References Cited

U.S. PATENT DOCUMENTS

| | | | | |
|---|---|---|---|---|
| 4,790,057 A | * | 12/1988 | Baker | ................... B25B 27/026 29/237 |
| 4,835,851 A | * | 6/1989 | Peele | ...................... B25B 5/061 269/126 |
| 5,058,869 A | * | 10/1991 | Ruthven | ................... B25B 7/00 269/228 |

(Continued)

FOREIGN PATENT DOCUMENTS

| | | |
|---|---|---|
| DE | 273 597 A1 | 11/1981 |
| DE | 20 2009 010 757 U1 | 2/2011 |

(Continued)

*Primary Examiner* — David P Bryant
*Assistant Examiner* — Nirvana Deonauth
(74) *Attorney, Agent, or Firm* — Bay State IP, LLC

(57) ABSTRACT

The invention relates to a twin gripper (1) for gripping two round-profile portions (2, 3) simultaneously, having a first mount (6) with a first bearing means (6a) and a further first bearing means (6b), and having a second mount (7) with a second bearing means (7a) and a further second bearing means (7b), wherein the first and second bearing means (6a, 7a) are connected to one another in a fixed position, and the first and second further bearing means (6b, 7b) are connected to one another in a resilient manner, and the two bearing means (6a, 7a) can be displaced back and forth in a displacement direction (V) in relation to the two further bearing means (6b, 7b).

8 Claims, 12 Drawing Sheets

(56) References Cited

U.S. PATENT DOCUMENTS

| | | | | |
|---|---|---|---|---|
| 6,056,282 | A * | 5/2000 | Desmarais | B25B 5/003 269/152 |
| 8,286,461 | B2 * | 10/2012 | Hofmann | B25B 27/10 29/751 |
| 8,584,335 | B2 * | 11/2013 | Tsang | B25B 5/12 269/266 |

FOREIGN PATENT DOCUMENTS

| | | |
|---|---|---|
| DE | 10 2010 021 422 A1 | 12/2011 |
| JP | S6199448 U | 6/1986 |
| JP | H11114868 A | 4/1999 |
| JP | 2011 212813 A | 10/2011 |

* cited by examiner

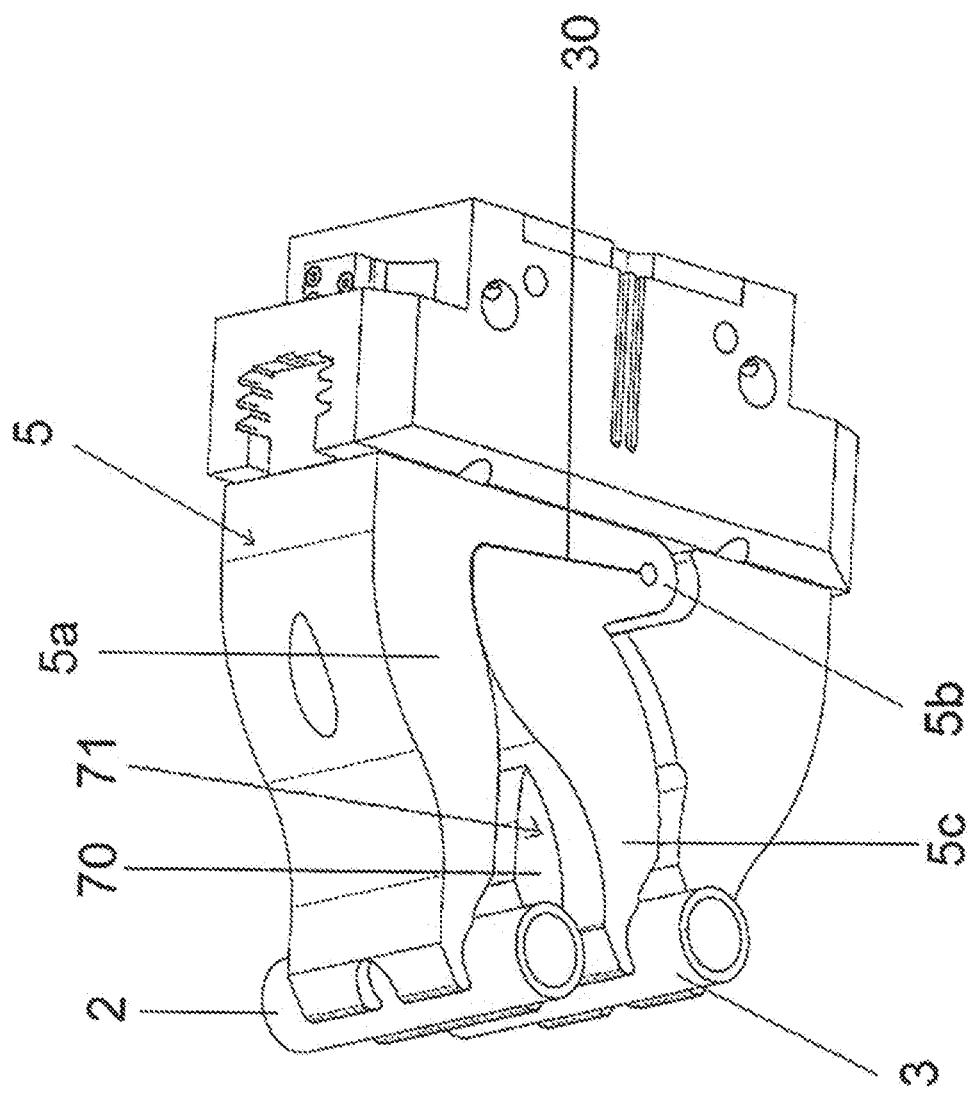

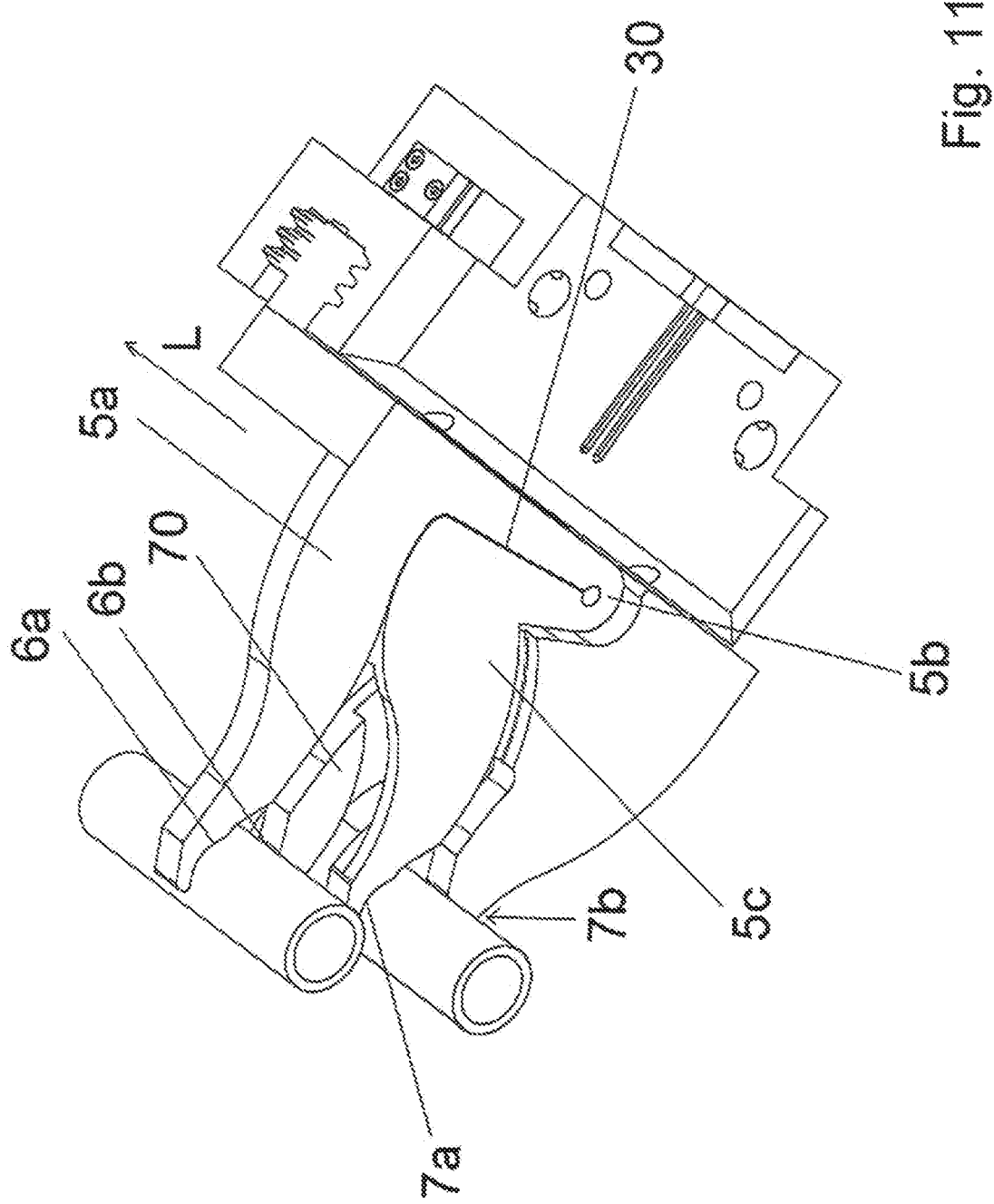

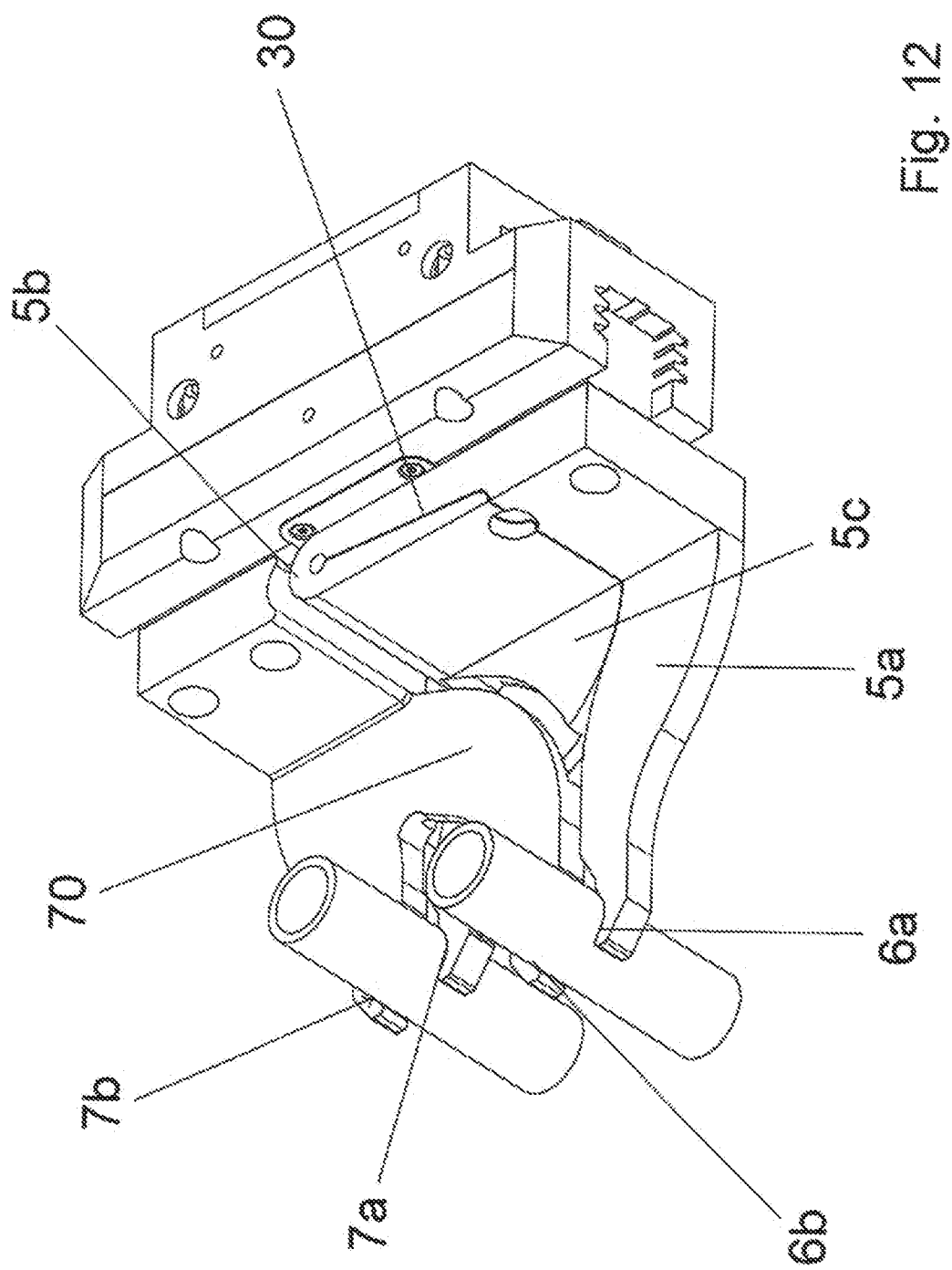

TWIN GRIPPER

CROSS REFERENCE TO RELATED PATENT APPLICATIONS

This patent application is filed herewith for the U.S. National Stage under 35 U.S.C. § 371 and claims priority to PCT application PCT/EP2014/074184, with an international filing date of Nov. 10, 2014. The contents of this application are incorporated in their entirety herein.

BACKGROUND OF THE INVENTION

The invention relates to a twin gripper.

Modern tube cutting machines are designed as sawing and machining centers in which tubes are cut to length and the tube ends are subjected to additional machining in further work steps. To transport the pipe portions cut to length from one machining station to the next, grippers are provided which grip the pipe portion cut to length in the sawing station and supply it to a chamfering device, for example. The pipe portion is clamped in the chamfering device and chamfered, and once the chamfering process has ended, the now-chamfered pipe portion is supplied by means of a further gripper to the next machining station, for example a length measurement facility in which an inspection of the length of the pipe portion is performed so that the latter can be made available in a tested state.

To increase the number of pipe portions cut to length, machined and tested per unit of time, a twin machining process is increasingly performed, i.e. two pipe portions are simultaneously cut to length from two long profiles. These then have to be gripped simultaneously by means of a twin gripper and transported in pairs to the respective next machining station in the further course of the machining.

The simultaneous gripping of two pipe portions causes problems insofar that the pipe portions are not exactly the same in terms of diameter but may exhibit minor variations, while the clamping of two pipe portions between two jaws in each case is generally inaccurate in terms of alignment such that one of the two pipe portions is typically not clamped and gripped tightly.

DE 20 2009 010 757 U1 discloses a rail gripper to handle rails as a lifting load. In this respect, two gripping elements are provided, each with two gripping jaws, wherein gripping jaws of the different gripping elements intersect and each of the two gripping jaws is thus allocated to both of the rails to be lifted.

In DE 10 2010 021 422 A1, a gripping device is described in which the individual gripping devices may be equipped with two or more gripping elements and all of the gripping elements of a gripping device can be displaced temporally in synchronicity to each other.

DE 2 73 597 A1 discloses a multiple gripper to serially insert scions transversely to the direction of movement. Disadvantageously, this is not suitable for a high-precision application in mechanical engineering.

BRIEF SUMMARY OF THE INVENTION

Therefore, the object of the present invention is to provide a twin gripper which permits simultaneous tight gripping of two round-profile portions.

The object is achieved by the twin gripper mentioned at the outset having the features of claim 1.

The twin gripper according to the invention for gripping two round-profile portions simultaneously comprises a first mount with a first bearing means and a further first bearing means and a second mount with a second bearing means and a further second bearing means.

According to the invention, the first and second bearing means are connected to one another in a fixed position, in a fixed position meaning that the first and second bearing means do not change their positions in relation to one another, even during the gripping process and even when a force is applied to the two round-profile portions. On the other hand, the first and second further bearing means are connected to one another in a resilient manner such that the general alignment inaccuracies in the gripping of two round-profile portions are compensated by four bearing means as one of the four bearing means, namely here the second further bearing means, is arranged in a resilient manner in relation to the first further bearing means.

To grip the two round-profile portions, in operation, the two bearing means can be displaced back and forth in a displacement direction in relation to the two further bearing means.

The second further bearing means can preferably be moved in the displacement direction in a resilient manner such that during gripping, a resilient yielding of the second further bearing means, preferably exactly in the displacement direction occurs and thus shifting of the second further bearing means vertically to the displacement direction is excluded and due to the four bearing means preferably being formed with a prismatic cross-section, each of the two round-profile portions is resting rotationally fixed on respective four contact lines in each of the two mounts during the gripping process.

Conveniently, the two further bearing means are formed from a one-piece jaw and a narrow spring portion forming the resilient force is formed between the two jaw portions including the further bearing means.

As modern tube cutting machines and their components have to operate in a highly precise manner, high-precision demands are also placed on the resilient twin gripper. According to the invention, the spring mechanism is thus formed by forming a gap in a metal block, preferably between the two jaw portions including the further bearing means, for example by means of wire erosion methods, the gap being open on one side and being limited by the spring portion on another side. The narrow spring portion in the shape of a circular segment and preferably consisting of metal forms the actual spring between the two jaw portions.

Conveniently, the gap has a constant gap width across the largest area of its extension. Through this, it is easier to produce the gap in a wire erosion method.

To make it possible to simultaneously and tightly grip two round-profile portions with differing diameters by means of the twin gripper, a distance of the two bearing means from one another in an un-tensioned state is slightly larger than a distance of the first bearing means from one another such that, even if a slightly thinner tube is gripped by a further mount, this can still be clamped tightly. The resilient movement of the second further bearing means preferably takes place parallel to the displacement direction.

In a particularly preferred embodiment of the invention, the twin gripper includes a gripping arm, at one end of which a gripping head with a centric clamping vice and two jaws with the two mounts which can be displaced symmetrically against each other in the centric clamping vice are arranged. Conveniently, the gripping head comprises the jaws which can be displaced against each other in the displacement direction, and the first jaw includes the two bearing means and the second jaw includes the two further bearing means. The movement of the two jaws is controlled electronically or pneumatically.

The extension of the bearing means in a longitudinal direction preferably depends on the type of twin gripper and is designed in a variable manner, but the extension of the spring portion in the longitudinal direction is designed equally, regardless of the extension of the bearing means such that the spring constant remains substantially the same, regardless of the type of twin gripper.

BRIEF DESCRIPTION OF THE SEVERAL VIEWS OF THE DRAWINGS

The invention is described by means of four exemplary embodiments in twelve figures. These show:

FIG. 10 a second perspective view of the twin gripper in FIG. 7;

FIG. 11 a first perspective view of a fourth embodiment of a twin gripper according to the invention with shorter mounts in comparison to the third embodiment; and FIG. 12 a second perspective view of the twin gripper in FIG. 11.

DETAILED DESCRIPTION OF THE INVENTION

The twin gripper 1 is suited for gripping two round profiles or round-profile portions simultaneously, round profiles being understood as solid or hollow profiles with an outer cross-section which is substantially along their longitudinal direction circular. The round profiles can include metallic proportions or can be formed completely from metal.

Figure 1:
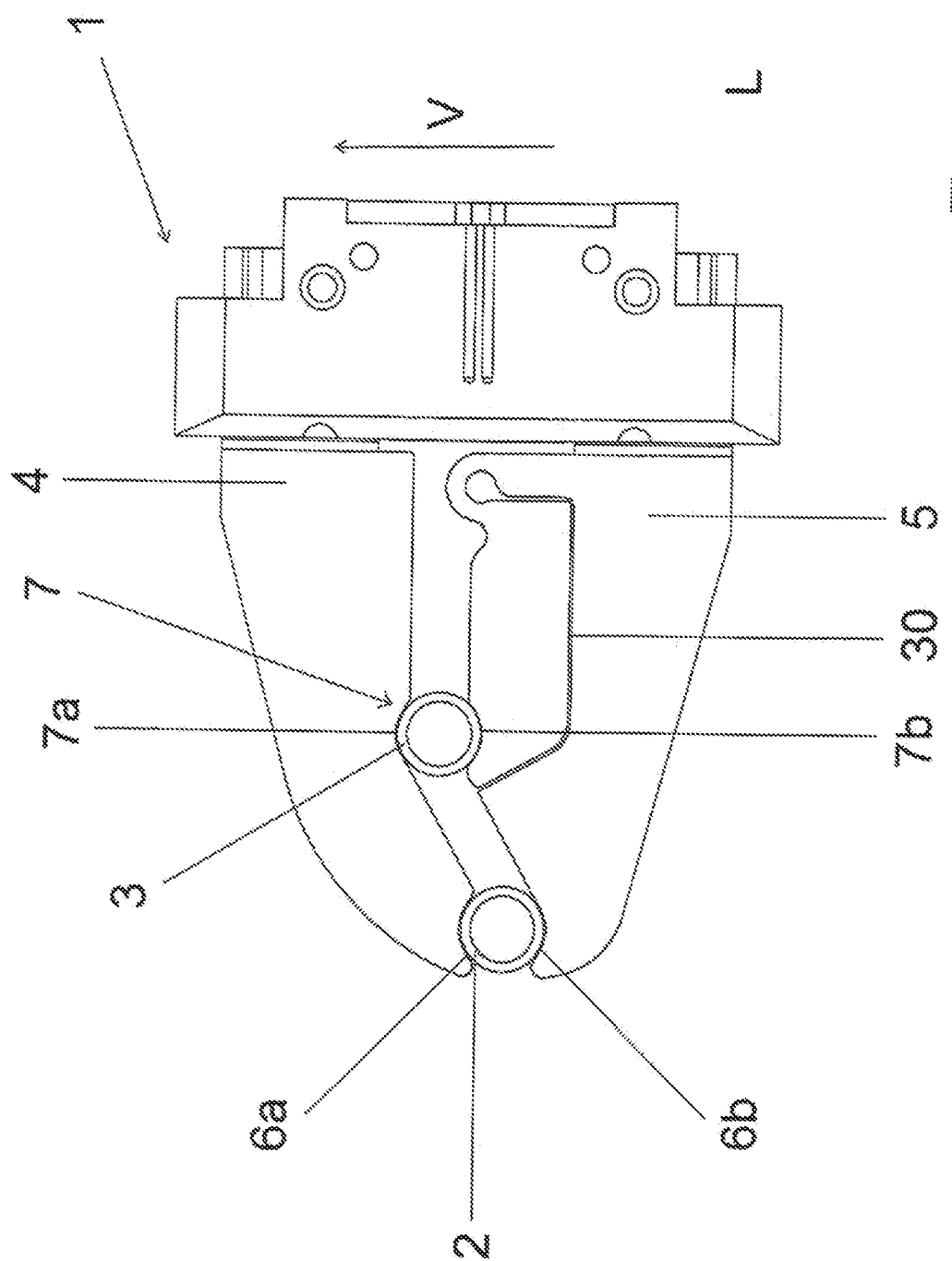
FIG. 1 a side view of a first embodiment of a twin gripper according to the invention.

The part of the twin gripper 1 illustrated in FIG. 1 is shown without an articulated twin gripper arm being part of a twin gripper head. The twin gripper arm moves the twin gripper head illustrated in FIG. 1 into the receiving positions to grip two tube portions 2, 3 simultaneously and transfers the twin gripper head into a release position to release the two tube portions 2, 3. The twin gripper 1 according to the invention is applied to tube cutting machines, for example, to bring the two tube portions 2, 3 from one machining station to the next.

After the two tube portions 2, 3 from two tubes disposed adjacent, preferably parallel to one another were clamped in a sawing station and cut to length simultaneously, the tube portions 2, 3 are gripped simultaneously with the aid of the twin gripper 1 according to the invention, de-clamped in the sawing station and supplied to a further machining station, for example a chamfering device, and clamped in the latter and released by the twin gripper 1. After the two tube portions 2, 3 were chamfered, they may once more be gripped by a further twin gripper 1, released from the chamfering device and supplied to a length control facility in which the two chamfered tube portions 2, 3 are subjected to a final inspection with regard to their length.

The twin gripper 1 according to the invention is suited for gripping the two tube portions 2, 3 simultaneously and securely. The twin gripper 1 includes a jaw 4 and a further jaw 5. A first bearing means 6a and a second bearing means 7a are arranged on the one jaw 4 which has been drawn at the top of FIG. 1, the further jaw 5 includes a first further bearing means 6b and a second further bearing means 7b. The two first bearing means 6a, 6b form a first mount 6 for the first tube portion 2 and the two second bearing means 7a, 7b form a second mount 7 for the second tube portion 3.

During operation and also during the gripping process, the first and second bearing means 6a, 7a are constantly arranged fixed in position in relation to one another. The first and second bearings means 6a, 7a are cast into a one-piece component, preferably into a metal component.

On the other hand, the first further bearing means 6b and the second further bearing means 7b are not constantly arranged exactly fixed in position to each other during the clamping process, but the second further bearing means 7b is typically moving during the gripping process in relation to the first further bearing means 6b. In the gripping state, the second further bearing means 7b is clamped against the first further bearing means 6b in a resilient manner. The resilient arrangement of one of the four bearing means 6a, 6b, 7a, 7b makes it possible to grip both tube portions 2, 3 simultaneously and tightly and with approximately the same force by the twin gripper 1.

The one jaw 4 and the further jaw 5 can be displaced against each other in a displacement direction V. In FIG. 1, the displacement direction V is arranged vertically to a longitudinal direction L. The longitudinal direction L runs parallel to the longitudinal direction of the tube portion. In FIG. 1, the longitudinal direction L is arranged vertically to the drawing plane and the displacement direction V is arranged in a vertical direction in the drawing plane.

Figure 2:
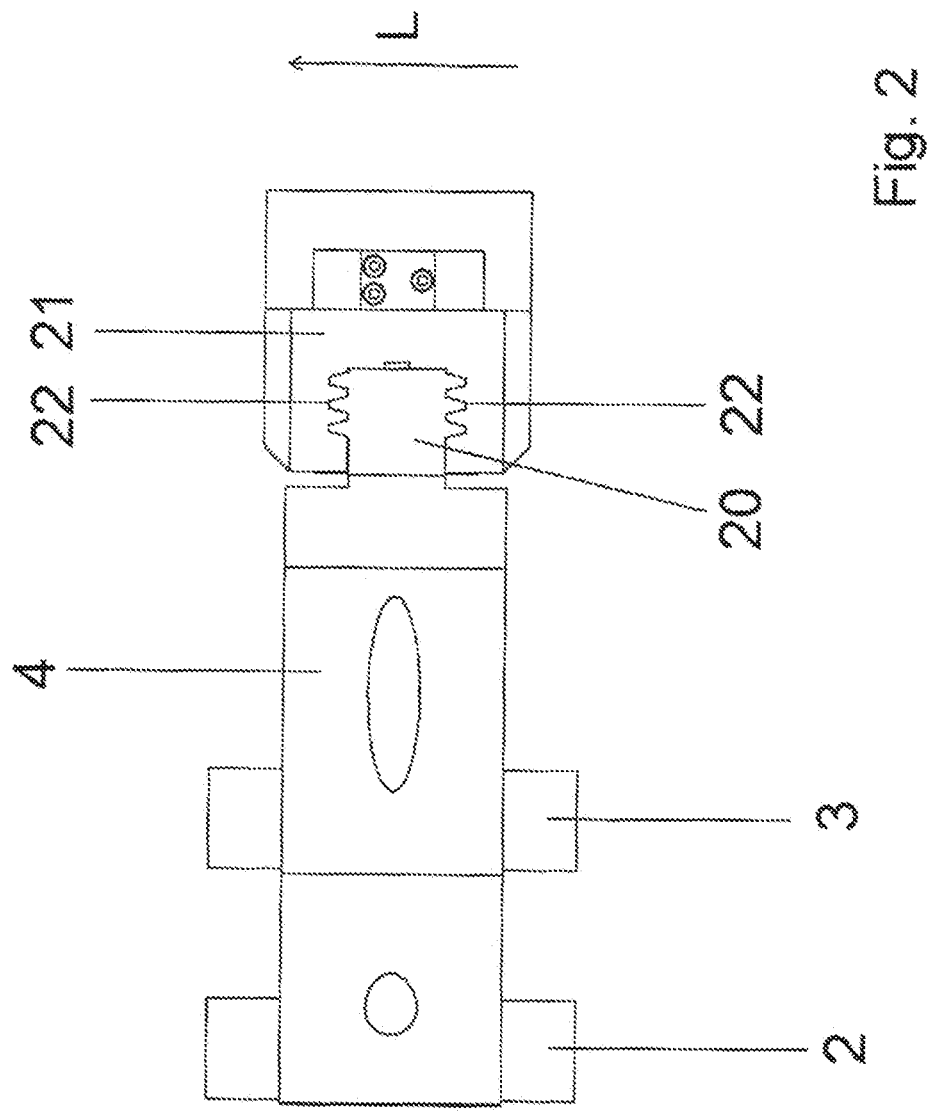
FIG. 2 a top view of the twin gripper in FIG. 1.

FIG. 2 shows the twin gripper in FIG. 1 in a top view. The one jaw 4 is guided by means of a stud 20 in a guide 21 of a centric clamping vice. On its outer sides in the longitudinal direction L, the stud 20 includes a profile 22 with a serrated cross-section which enlarges the guidance face of the stud 20 in the guide 21 and thus ensures an improved guidance stability. In FIG. 2, the two tube portions 2, 3 clamped simultaneously can be seen. The centric clamping vice having the guide 21, the stud 20 and the serrated profile 22 is known in the prior art. The two jaws 4, 5 can be tightened on the stud 20 by means of screws.

Figure 3:
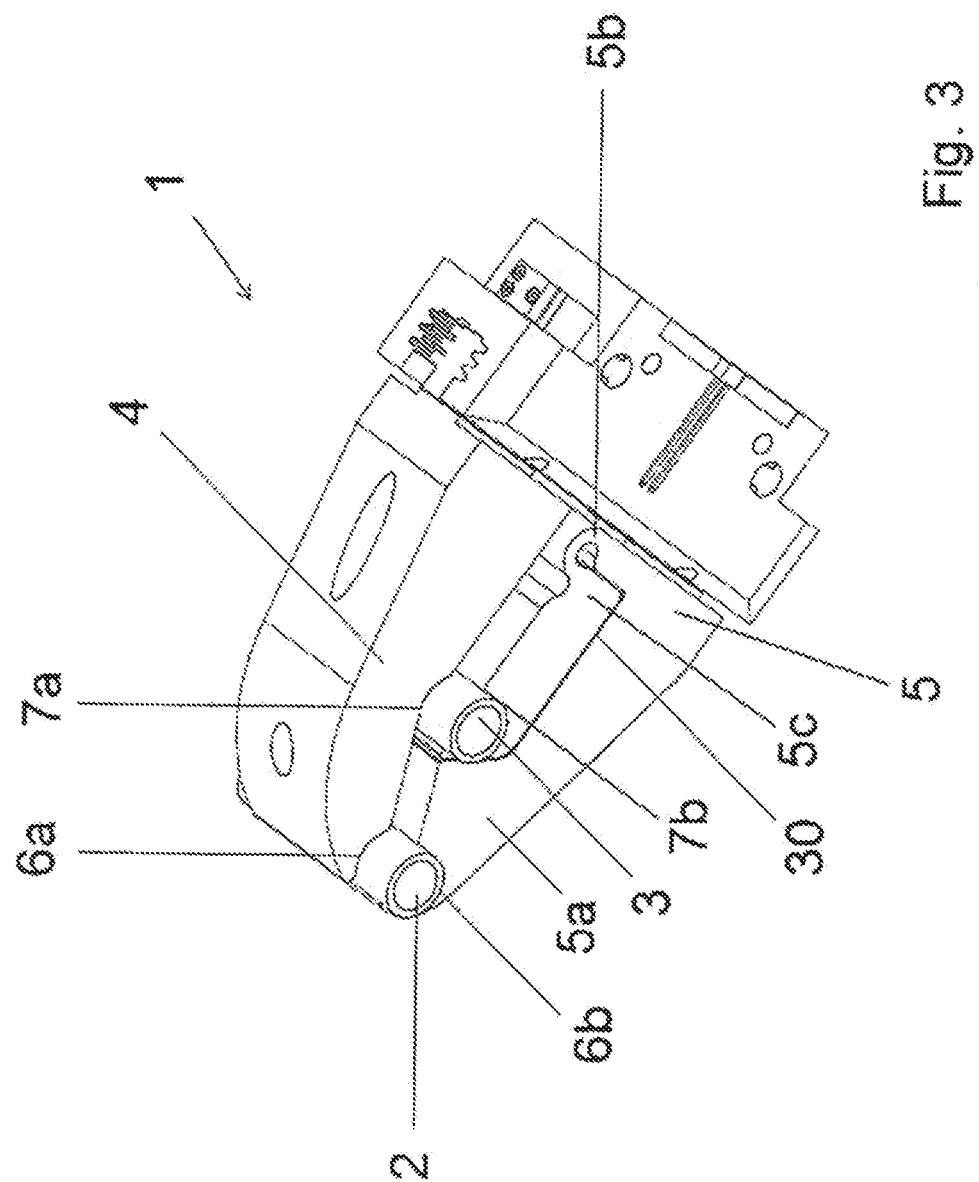
FIG. 3 a first perspective view of the twin gripper in FIG. 1.

FIG. 3 shows the twin gripper of FIG. 1 in a first perspective view. The two tube portions 2, 3 are gripped simultaneously and tightly with approximately the same force. The further jaw 5 is also formed from a one-piece component, preferably a one-piece metal component. The further jaw 5 includes a first jaw portion 5a which comprises the first further bearing means 6b. The first jaw portion 5a is connected to a second jaw portion 5c which comprises the second further bearing means 7b by a spring portion 5b which is formed in a semi-circular shape. The first jaw portion 5a and the second jaw portion 5c are completely separated from one another by a narrow gap 30 and are only connected with each other in a resilient manner by the narrow spring portion 5b. The further jaw 5 can be produced in one piece from the metal block by a wire erosion method, for example.

By manufacturing different twin grippers 1 with differing thicknesses of the narrow spring portion 5b in the shape of a ring segment, the spring force can be changed. The thinner the spring portion 5b, the smaller the spring force and vice versa.

The two first bearing means 6a, 6b and the two second bearing means 7a, 7b are arranged directly on top of each other in the displacement direction V. During the gripping process, a force is applied to the second further bearing means 7b, and the second jaw portion 5c is pressed in a resilient manner into the gap 30 in the direction of the first jaw portion 5a. During this, the movement of the second jaw portion 5c is at least during the start of the clamping process effected exactly in the displacement direction V such that both the first tube portion 2 and the second tube portion 3 are tightly clamped and gripped, respectively. The four bearing means 6a, 6b, 7a, 7b are formed with a prismatic cross-section vertically to the longitudinal direction L such that a tube portion 2, 3 lying in the mount 6, 7 forms two parallel contact lines with each of the bearing means.

The diameters of tube portions 2, 3 cut to length can usually vary by 0.2 mm. The twin gripper 1 is designed in such a way that it can compensate diameter variations between the tube portions of about 0.5 mm. A vertical movement of the second further bearing means 7b vertically to the longitudinal direction L and vertically to the displacement direction V is only 0.005 mm in the embodiment illustrated in FIGS. 1 and 3.

Figure 4:
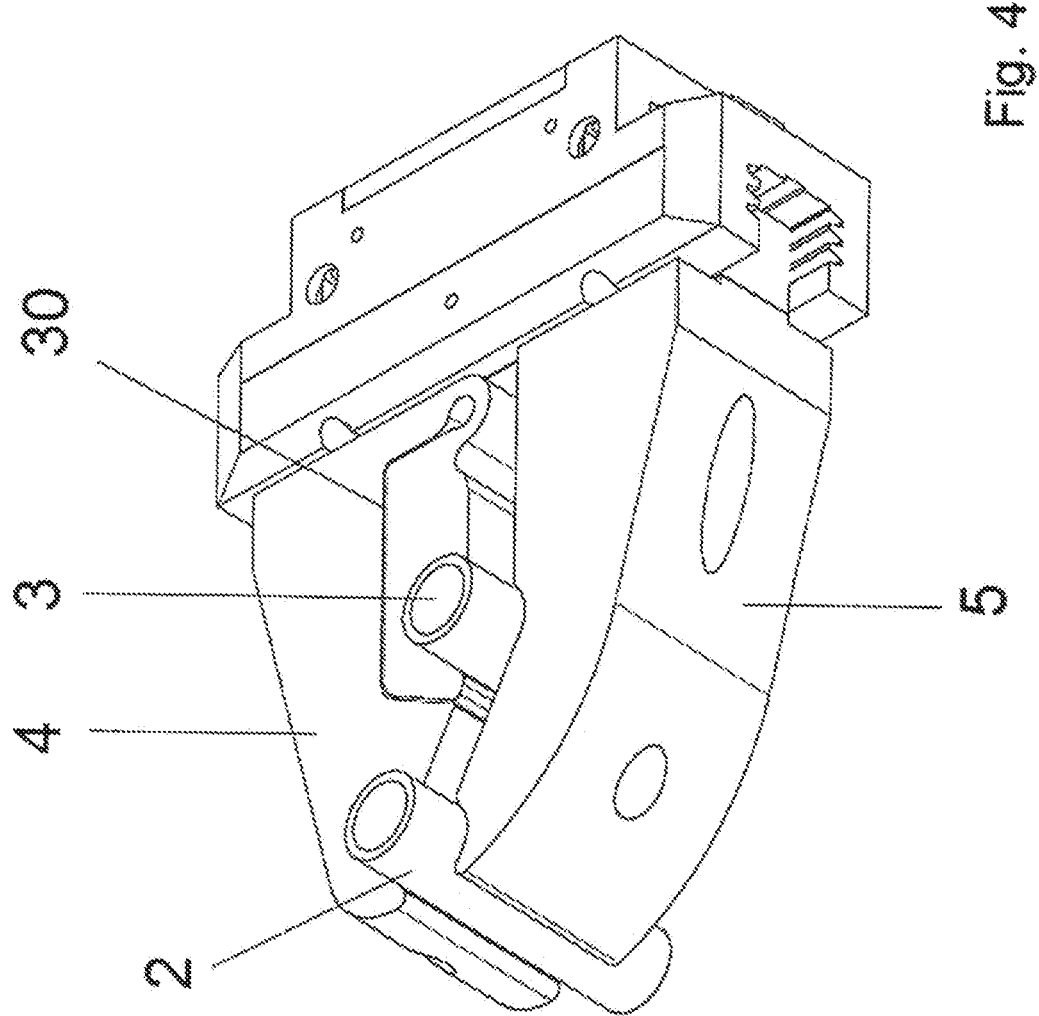
FIG. 4 a second perspective view of the twin gripper in FIG. 1.

FIG. 4 shows the twin gripper 1 in a second perspective view from the bottom onto the further jaw 5.

Figure 5:
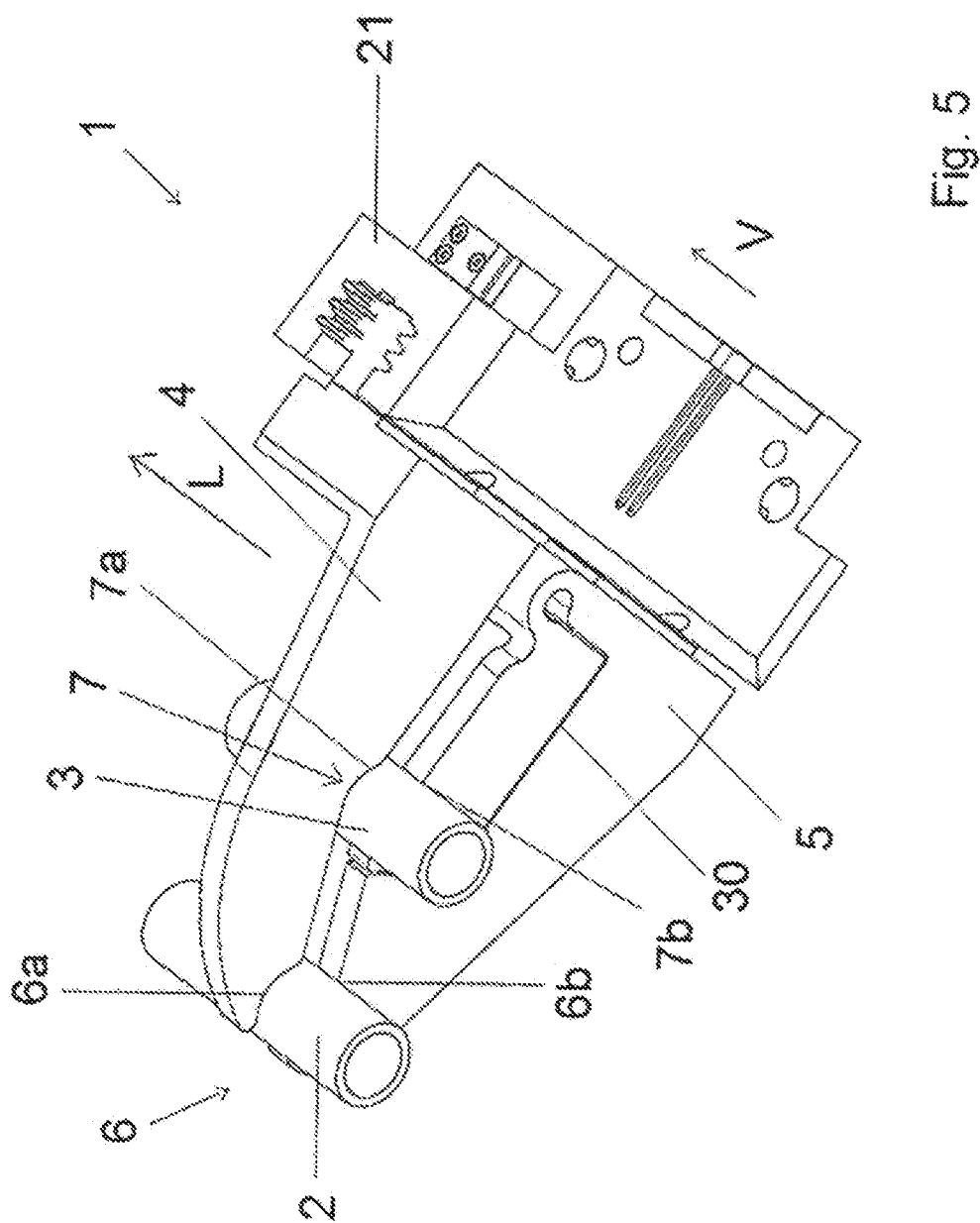
FIG. 5 a second embodiment of the twin gripper according to the invention with narrower mounts in comparison to the first embodiment.
Figure 6:
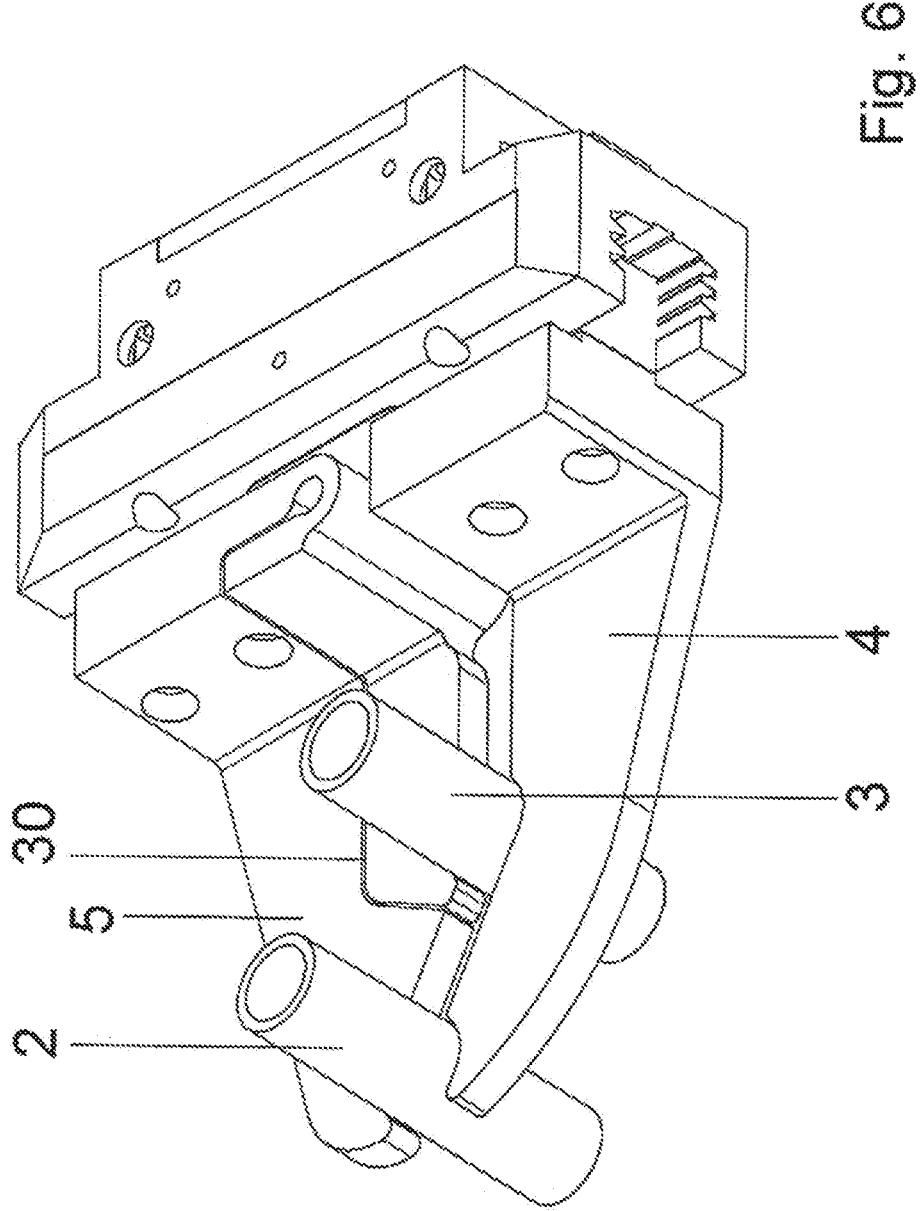
FIG. 6 a second perspective view of the twin gripper in FIG. 5.

FIGS. 5 and 6 show a twin gripper 1 similar to the twin gripper 1 illustrated in FIGS. 1 to 4 in which the four bearing means 6a, 6b, 7a, 7b are formed markedly shorter in the longitudinal direction L. However, the displacement mechanism of the two jaws 4, 5 in the guide 21 is identical, and the two jaws 4, 5 particularly include an identical extension as in FIGS. 1 to 4 in the area adjacent to the guide 21 in the longitudinal direction L. Only the areas of the two jaws 4, 5 in which the two mounts 6, 7 are located are formed markedly shorter in the longitudinal direction L than in the first embodiment. As FIGS. 5 and 6 also show, the spring portion 5b of the first embodiment and that of the second embodiment have the same length. In this regard, the spring constant of the first embodiment and of the second embodiment are likewise at least substantially identical. The twin gripper 1 of the second embodiment is of course particularly suited for gripping shorter tube portions 2, 3 cut to length. FIG. 6 also shows the fixing of the two jaws 4, 5 on the stud 20 of the known centric clamping vice by means of four screws.

Figure 7:
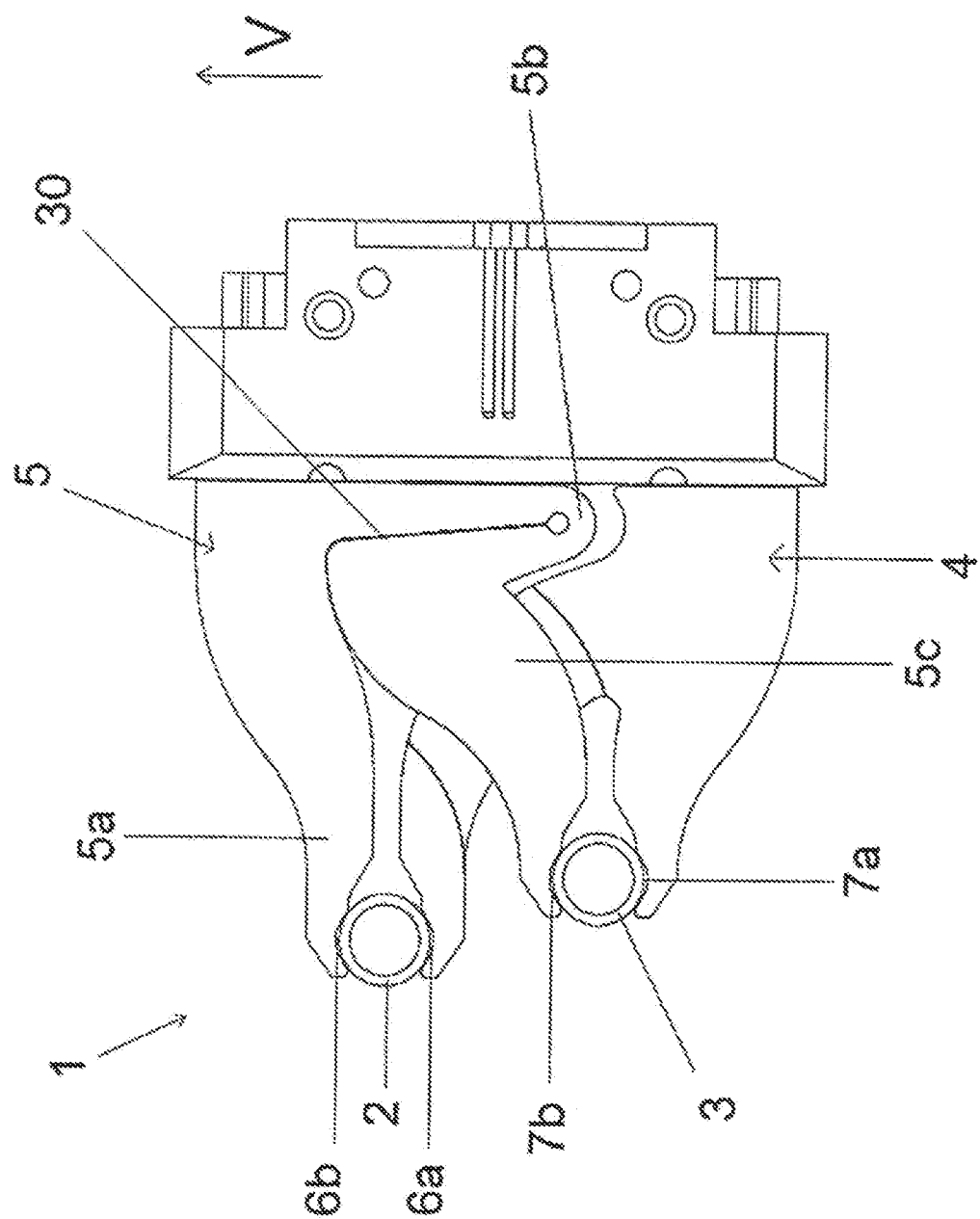
FIG. 7 a side view of a third embodiment of the twin gripper according to the invention.

FIG. 7 shows a third embodiment of a twin gripper 1 according to the invention. While the two tube portions 2, 3 are arranged next to each other substantially vertical to the displacement direction V in the first two embodiments, the two tube portions 2, 3 of the third embodiment are arranged next to each other substantially parallel to the displacement direction V.

In FIG. 7, identical reference numerals designate identical components as in the first two embodiments. The two further bearing means 6b, 7b are connected to one another in a resilient manner. The two further bearing means 6b, 7b are here as well formed in one piece from a metal component by a wire erosion method.

In contrast to the first and second embodiments, the gap 30 formed between the first jaw portion 5a and the second jaw portion 5c here runs substantially parallel to the displacement direction V while it is formed substantially vertically to the displacement direction V in the first and second embodiments. The spring portion 5b is likewise formed with a semi-circular cross-section vertically to the longitudinal direction L across its entire longitudinal extension.

Figure 8:
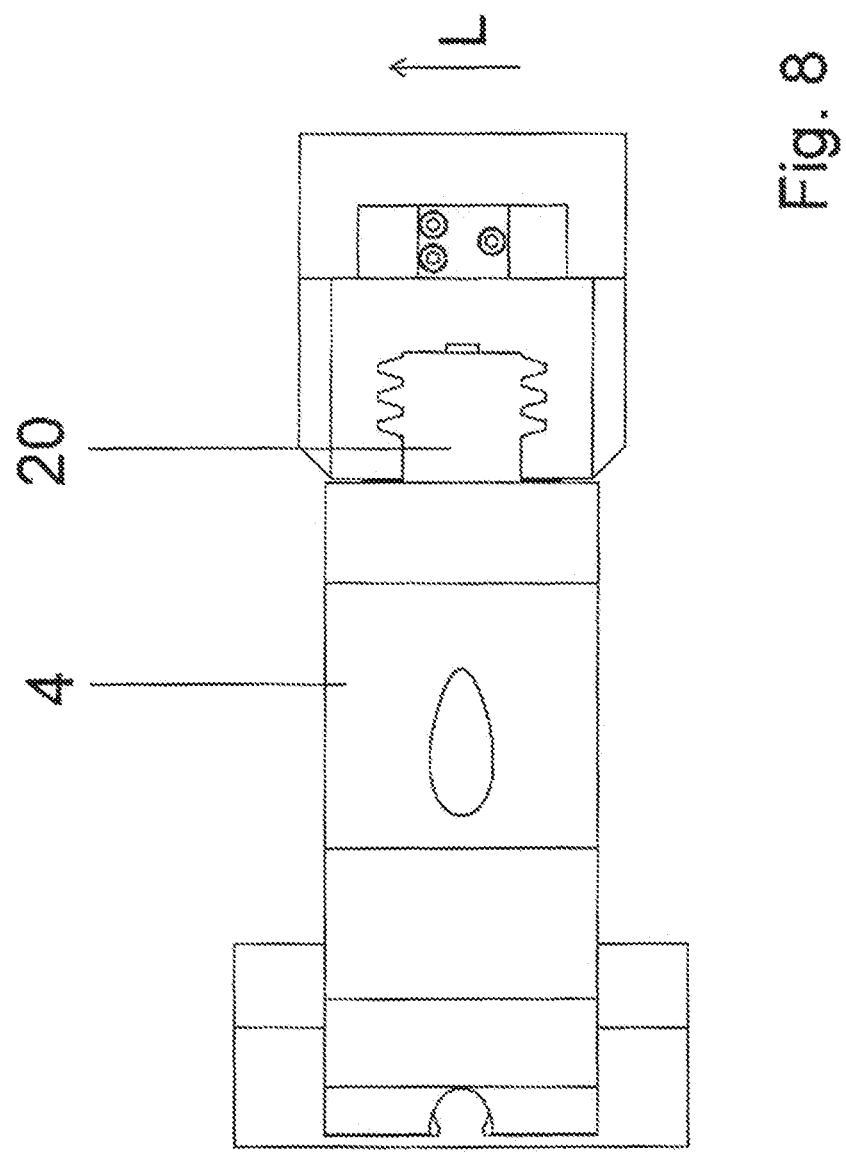
FIG. 8 a top view of the third embodiment of the twin gripper according to the invention in FIG. 7.

FIG. 8 shows the guide 21 of the two jaws 4, 5 in FIG. 7 which is formed identical in construction to the guide 21 of the twin gripper 1 of the first and second embodiments.

The first bearing means 6a of the third embodiment in FIG. 7 is arranged on an arm 70 which is passed through an opening 71 in the second jaw portion 5c.

Figure 9:
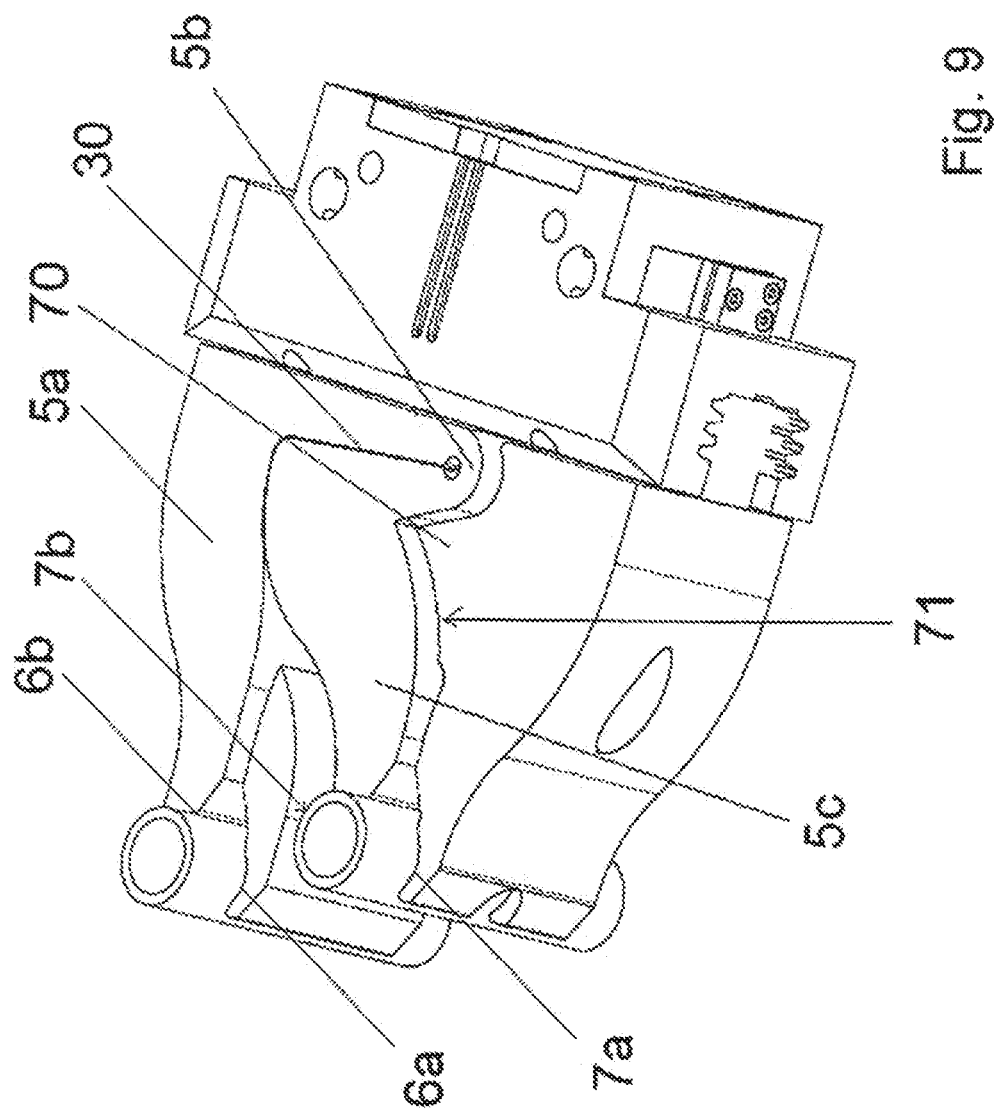
FIG. 9 a first perspective view of the twin gripper in FIG. 7.

FIGS. 9 and 10 show the arrangement somewhat clearer. Even when tensioned, the first bearing means 6a and the second bearing means 7a are connected to one another fixed in position by means of the arm 70 which is passed through the opening 71.

FIGS. 11 and 12 show analogous to FIGS. 5 and 6 a fourth embodiment of the twin gripper 1 according to the invention which is insofar different from the third embodiment that the extension of the bearing means 6a, 6b, 7a, 7b in the longitudinal direction L is markedly shortened in comparison to the third embodiment. The extension of each of the bearing means 6a, 6b, 7a, 7b in the longitudinal direction L of the fourth embodiment and of the second embodiment is 10 mm along the entire extension of the bearing means 6a, 6b, 7a, 7b vertical to the longitudinal direction L while the extension of the bearing means 6a, 6b, 7a, 7b in the longitudinal direction L of the first and third embodiments is 60 mm. Other extensions are of course also conceivable. However, the extension of the spring portion 5b in the longitudinal direction L of the third and fourth embodiments is the same such that the spring constant of the third and fourth embodiments is likewise at least substantially identical.

However, the twin gripper 1 illustrated in FIGS. 11 and 12 includes no opening 71 in the second jaw portion but instead the second jaw portion 5c and the arm 70 are tapered complementing each other in an overlapping area. The extension of the arm 70 as well as the extension of the second jaw portion 5c in the longitudinal direction L is slightly less in the overlapping area than half of the other extension of the arm 70 and the second jaw portion 5c in the longitudinal direction L. In this exemplary embodiment, the other extension in the longitudinal direction is 10 mm. Through this, the longitudinal extension does also not exceed the other longitudinal extension of 10 mm in the overlapping area of the arm 70 and the second jaw portion 5c.

LIST OF REFERENCE NUMERALS

1 Twin gripper
2 Tube portion
3 Tube portion
4 A jaw
5 A further jaw
5a First jaw portion
5b Spring portion
5c Second jaw portion
6 First mount
6a First bearing means
6b First further bearing means
7 Second mount
7a Second bearing means 7b Second further bearing means
20 Stud
21 Guide
22 Serrated profile
30 Narrow gap
70 Arm
71 Opening
L Longitudinal direction
V Displacement direction

What is claimed is:

1. A twin gripper for gripping two round-profile portions (2, 3) simultaneously, comprising a first mount (6) with a first bearing means (6a) and a further first bearing means (6b) and a second mount (7) with a second bearing means (7a) and a further second bearing means (7b), including a gripping arm, at one end of which a gripping head with a centric clamping vice and a jaw (4) and a further jaw (5) are arranged,
wherein the first and second bearing means (6a, 7a) are connected to one another in a fixed position, and the first and second bearing means (6a, 7a) are constantly arranged fixed in position to one another during the gripping process and the further first and the further second bearing means (6b, 7b) are connected to one another in a resilient manner, and the two bearing means (6a, 7a) can be displaced back and forth in a displacement direction (V) in relation to the two further bearing means (6b, 7b) and the two further bearing means (6b, 7b) are formed from the further jaw (5) which is a one-piece further jaw (5) and the further jaw (5) includes a first jaw portion (5a) which comprises the first further bearing means (6b) and a second jaw portion (5c) which comprises the second bearing means (7b) and a narrow spring portion (5b) forming the resilient force between two jaw portions (5a, 5c) including the two further bearing means (6b, 7b) and the two jaw portions 5a, 5c are both part of the one-piece further jaw (5) and the narrow spring portion (5b) connects the first jaw portion (5a) comprising the further first bearing means (6b) and the second jaw portion (5c) comprising the further second bearing means (7b),
and wherein the first jaw portion (5a) and the second jaw portion (5c) are separated from each other by a narrow gap (30) in a resilient manner by the narrow spring portion (5b), the gap (30) is formed between the further bearing means (6b, 7b) including the two jaw portions (5a, 5c), the gap being open on one side and being limited by the spring portion (5b) on another side.

2. The twin gripper according to claim 1, characterized in that the further second bearing means (7b) is movable in the displacement direction (V) in a resilient manner.

3. The twin gripper according to claim 1, characterized in that the gap (30) has a constant gap width across the largest area of the extension of the gripper.

4. The twin gripper according to claim 1, characterized in that a distance of the second bearing means (7a, 7b) from one another in an un-tensioned state is larger than a distance of the first bearing means (6a, 6b) from one another.

5. The twin gripper according to claim 1, characterized in that the resilient movement of the further second bearing means (7b) takes place parallel to the displacement direction (V).

6. The twin gripper according to claim 1, characterized by a gripping arm (70), at one end of which a gripping head with the two mounts (6, 7) is arranged.

7. The twin gripper according to claim 6, characterized in that the gripping head includes the two jaws (4, 5) which are displaced against each other and the one jaw (4) includes the two bearing means (6a, 7a) and the further jaw (5) includes the two further bearing means (6b, 7b).

8. The twin gripper according to claim 7, characterized in that the extension of the bearing means (6a, 6b, 7a, 7b) in a longitudinal direction (L) depends on the type of twin gripper and is designed in a variable manner, but the extension of the spring portion (5b) in the longitudinal direction (L) is designed equally, regardless of the extension of the four bearing means (6a, 6b, 7a, 7b).

* * * * *